(12) United States Patent
Li et al.

(10) Patent No.: US 10,888,977 B2
(45) Date of Patent: Jan. 12, 2021

(54) SUCTION DEVICE

(71) Applicant: Zhejiang University, Hangzhou (CN)

(72) Inventors: Xin Li, Hangzhou (CN); Kaige Shi, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 16/290,230

(22) Filed: Mar. 1, 2019

(65) Prior Publication Data
US 2019/0270186 A1 Sep. 5, 2019

(30) Foreign Application Priority Data
Mar. 1, 2018 (CN) .............................. 2018 1 017282

(51) Int. Cl.
*B25B 11/00* (2006.01)
(52) U.S. Cl.
CPC .................................. *B25B 11/005* (2013.01)
(58) Field of Classification Search
CPC ............................... B25B 11/00; B25B 11/005
See application file for complete search history.

(56) References Cited

U.S. PATENT DOCUMENTS

| | | | | |
|---|---|---|---|---|
| 5,556,243 A | * | 9/1996 | Bory ................. | B23Q 11/0046 144/135.2 |
| 6,196,533 B1 | * | 3/2001 | Hudson ............... | B25B 11/005 269/21 |
| 2006/0157905 A1 | * | 7/2006 | Lenzini ............... | B25B 11/005 269/21 |
| 2010/0025905 A1 | * | 2/2010 | Eisele ................. | B65H 3/0891 269/21 |
| 2011/0053092 A1 | * | 3/2011 | Aoki .................. | G03F 7/70791 430/319 |
| 2019/0270186 A1 | * | 9/2019 | Li ........................ | B65G 47/91 |

* cited by examiner

*Primary Examiner* — Lee D Wilson
(74) *Attorney, Agent, or Firm* — McCoy Russell LLP

(57) ABSTRACT

The present disclosure relates to a suction device including a shell with a chamber, the chamber including an opening. A fan is disposed in the chamber, and a power component for driving the fan to rotate is disposed on the shell. An external fluid source holding an additional fluid is connected to the chamber. The additional fluid of the external fluid source flows into the chamber to occupy a volume in the chamber and at least partially forces a first fluid originally present in the chamber out of the chamber. The fan drives fluids in the chamber to rotate so that a stepped negative pressure is generated in the chamber, with a magnitude of the negative pressure decreasing as a distance to a periphery of the chamber decreases. Thereby, a pressure difference between an inside and an outside of the shell is decreased, decreasing vacuum leakage of the suction device.

17 Claims, 5 Drawing Sheets

SUCTION DEVICE

CROSS REFERENCE TO RELATED APPLICATIONS

The present application claims priority to Chinese Application No. 20181017282.1 entitled "SUCTION DEVICE," filed Mar. 1, 2018. The entire contents of the above-listed application are hereby incorporated by reference for all purposes.

TECHNICAL FIELD

The present description relates to the field of negative pressure adsorption technologies of a rotating fluid flow, and in particular, to a suction device.

BACKGROUND

Vacuum adsorbers are widely used in object handling equipment of automated production lines and are very useful automated devices. The structure of a common vacuum adsorber is shown in FIG. 1. The vacuum adsorber generally consists of a vacuum source 1' (a vacuum pump, etc.) and an adsorption chamber 2' that are connected to each other. The vacuum source 1' sucks the fluid in the adsorption chamber 2' to form a vacuum in the chamber, thereby generating an adsorption force and sucking up the workpiece 3' placed under the adsorption chamber 2'. Such a vacuum adsorber has serious technical drawbacks: because the negative pressure distribution in the adsorption chamber 2' is almost uniform, a severe pressure difference forms between the inner and outer sides of the edge of the adsorption chamber 2' (an environmental pressure is present on the outer side of the edge of the adsorption chamber 2', and a vacuum is present on the inner side of the edge of the adsorption chamber 2'). Due to the pressure difference, the external fluid is sucked into the adsorption chamber 2'. Especially when the surface of the workpiece 3' is rough, there are many gaps between the adsorption chamber 2' and the workpiece 3', and the external fluid will enter the adsorption chamber 2' of the vacuum adsorber through these gaps and degrade the vacuum in the adsorption chamber 2', causing the adsorption force of the adsorption chamber 2' to be significantly lowered, thereby resulting in the failure of the workpiece adsorption function of the vacuum adsorber.

SUMMARY

The technical problem to be resolved by the present disclosure is to provide a suction device to solve the problem of vacuum leakage caused by the pressure difference between the inner and outer sides of the edge of the adsorption chamber. Although the structure is simple, the adsorption capacity of the adsorption chamber is increased.

In one example, the issues described above may be addressed by a suction device, comprising: a shell, including a chamber disposed therein, the chamber including an opening; a fan disposed in the chamber; a power component for driving the fan to rotate, the power component disposed on the shell; and a fluid source holding an additional fluid, the additional fluid different from a first fluid originally present in the chamber, the fluid source connected to the chamber, and wherein the additional fluid of the fluid source flows into the chamber to occupy a volume in the chamber and at least partially forces the first fluid originally present in the chamber out of the chamber, and the fan drives fluids in the chamber to rotate. In this way, degradation of vacuum in the chamber may be decreased.

As one example, a density of the additional fluid may be greater than that of the first fluid, and thus the additional fluid may be driven to the periphery of the chamber by the fan. The first fluid may be a gas, and the additional fluid may be a liquid, for example. As another example, the shell may be further provided with a suction hole, with one end of the suction hole connected to a region of the chamber where the additional fluid is not present, and the other end of the suction hole connected to a vacuum source. Further, the shell may be additionally provided with one or more inflow holes, with the external fluid source connected to the chamber through one or more inflow pipes, and the additional fluid of the external fluid source may flow from the external fluid source into the chamber through the one or more inflow holes or flow out of the chamber to the external fluid source, and the external fluid source may be further provided with a flow regulating device. As another example, the external fluid source may include more than one additional fluid that are each different than the first fluid.

As another example, the external fluid source may include a water tank disposed outside the shell, with the additional fluid disposed in the water tank, the water tank and the chamber interconnected, and the water tank and an external environment of the shell also connected to each other. As a still further example, the additional fluid in the water tank may be connected to the chamber through a gap existing between the shell and an adsorbed surface, or the additional fluid in the water tank may be connected to the chamber through a connecting flow channel disposed on the shell. Further, in some examples, the bottom of the outer wall of the water tank may be provided with a soft sealing body for blocking the gap between the outer wall of the water tank and the adsorbed surface. Further still, the water tank may be a semi-closed water tank with the top and side walls closed, and the water tank may be provided with an input hole through which the additional fluid flows into the water tank. In some examples, the water tank may be respectively connected to an external tank of the additional fluid through an input pipe and a return pipe, and a pump may be mounted on the input pipe. In some examples, the shell may further include one or more pressure sensors, and the pressure sensor may be used to sense pressure changes within the chamber.

Compared with the prior technology, the suction device of the present disclosure is provided with a fan in a chamber in a shell, and the fan is driven to rotate by a power component; the chamber is provided with an opening; and the additional fluid is introduced into the chamber to occupy the volume of the chamber, and partially or completely forces the first fluid in the chamber out of the chamber; and the fan drives fluids in the chamber to rotate, so that a negative pressure distribution with gradient changes is generated in the chamber. The first fluid is located in a central region of the chamber, and the additional fluid is located in a peripheral region of the chamber. A closer distance to the periphery of the chamber indicates a lower negative pressure, thereby remarkably lowering pressure difference of the inner and outer side of the shell. The problem of vacuum leakage caused by a large pressure difference between the inner and outer sides of an edge of the shell in a conventional adsorption mode is thoroughly decreased. The suction device of the present disclosure is characterized by having simple structure, small vacuum leakage and stable adsorption force, being capable of adsorbing a rough surface, and so on.

It should be understood that the summary above is provided to introduce in simplified form a selection of concepts that are further described in the description of embodiments. It is not meant to identify key or essential features of the claimed subject matter, the scope of which is defined uniquely by the claims that follow the description of embodiments. Furthermore, the claimed subject matter is not limited to implementations that solve any disadvantages noted above or in any part of this disclosure.

DESCRIPTION OF EMBODIMENTS

Figure 1:
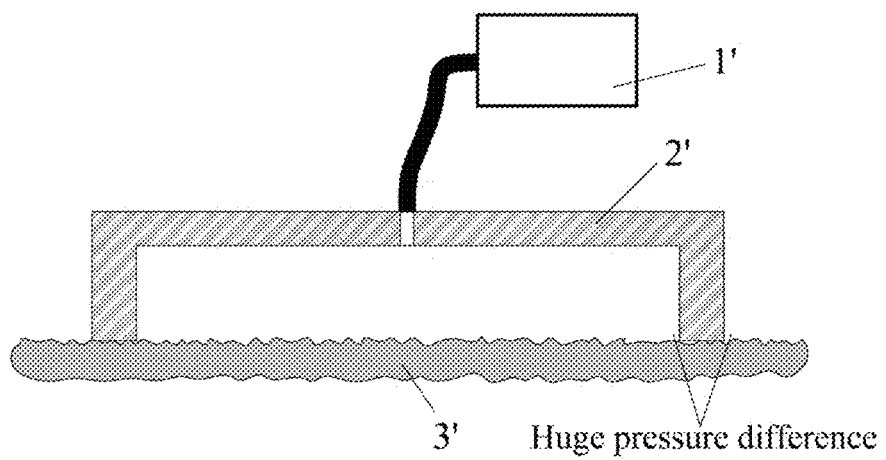
FIG. 1 is a schematic diagram showing a structure of an existing vacuum adsorber.
Figure 2:
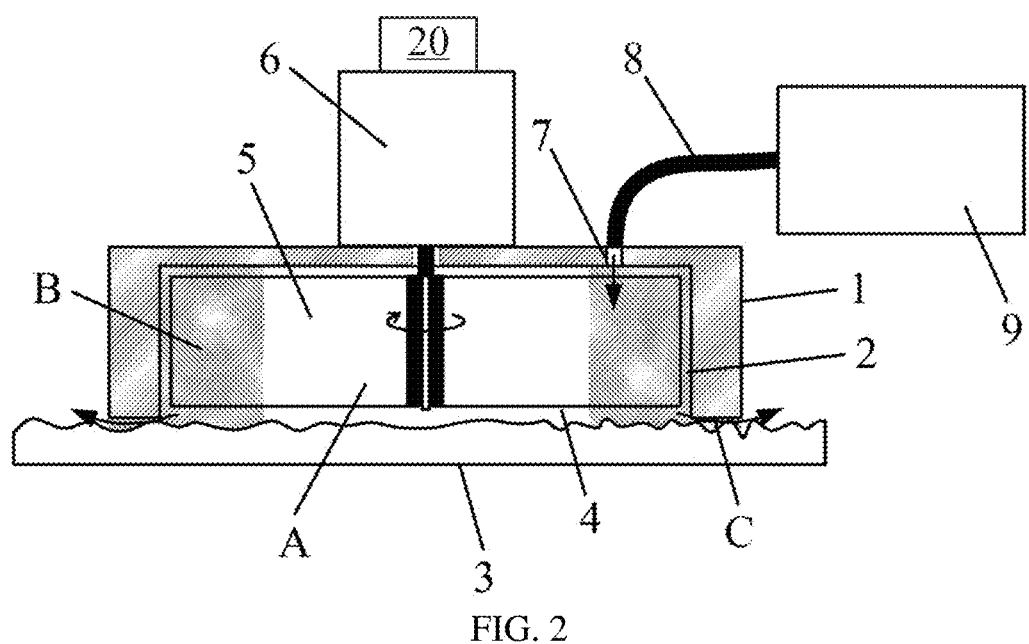
FIG. 2 is a schematic planar cross-sectional view showing a first embodiment of the present disclosure.

The following description relates to a suction device for adsorbing a workpiece. FIG. 2 schematically shows a first exemplary embodiment of the suction device, which, during operation, may create a pressure distribution within a chamber of the suction device that generates an adsorption force for adsorbing the workpiece, such as the example pressure distribution shown schematically in FIG. 3. FIGS. 4-10 schematically show additional exemplary embodiments of the suction device. To make the technical problem to be resolved in the present disclosure, technical solutions, and beneficial effects of the present disclosure clearer and more comprehensible, the following further describes the present disclosure in detail with reference to the accompanying drawings and embodiments. It should be understood that the specific embodiments described herein are merely used to explain the present disclosure and are not intended to limit the present disclosure.

Embodiment 1

Referring to FIG. 2, a suction device according to a first embodiment of the present disclosure includes a shell 1, where a chamber 2 is provided in the shell 1. The shell 1 includes a side wall and a top wall, with the side wall and the top wall defining the chamber 2 as an interior of the shell 1. The chamber 2 is provided with an opening 4 opposite the top wall, and an end face of the opening 4 is an adsorption surface of the suction device and is used for adsorbing a workpiece 3. As one example, the side wall may be a substantially cylindrical in shape so that the shell forms a cylinder capped on one end by the top wall. Thus, the chamber 2 may be substantially cylindrical in shape. There is a gap C between the shell 1 and an adsorbed surface of the workpiece 3.

A rotatable fan 5 is disposed in the chamber 2. The opening 4 is disposed between the workpiece 3 and the fan 5 so that the opening 4 is vertically below the fan 5 in the view shown in FIG. 2. A power component 6 for driving the fan 5 to rotate is disposed on the shell 1, such as coupled to the top wall of the shell 1 and coupled to the fan 5 via a shaft of the fan 5 and an opening in the top wall of the shell 1. In some examples, an electronic controller 20 may be included within or external to the power component 6 for controlling rotation of the fan 5. As an example, the controller 20 may be wired or wireless communication with the power component 6. For example, the controller 20 may be a microcomputer, including a microprocessor unit, input/output ports, an electronic storage medium for executable programs and calibration values (e.g., read only memory), random access memory, keep alive memory, and a data bus. The storage medium read-only memory may be programmed with computer readable data representing instructions executable by the microprocessor for performing the methods and routines, such as those for controlling the rotational speed of the fan 5, for example. As an example, the controller 20 may receive feedback from one or more sensors of the suction device, an example of which will be described below with respect to FIG. 10, process the input data, and adjust operation of one or more actuators, including the power component 6 of the fan 5, according to one or more routines. As one example, the controller 20 may infer the rotational speed of the fan 5 based on the power output (or a duty cycle of operation) of the power component 6. For example, the controller 20 may input the power output (or duty cycle of operation) of the power component 6 into a look-up table stored in a memory of the controller, which may output the corresponding rotational speed of the fan 5.

An external fluid source 9 is disposed outside the shell 1, and an additional fluid B is disposed in the external fluid source 9. The additional fluid B (e.g., a second fluid) is different from a first fluid A originally present in the chamber 2. The external fluid source 9 is connected to the chamber 2, and the additional fluid B of the external fluid source 9 flows into the chamber 2 to occupy a volume in the chamber, and partially or completely forces the first fluid A originally present in the chamber 2 out of the chamber. The fan 5 drives fluids in the chamber 2 to rotate, and the rotating fluids include the first fluid A and the additional fluid B.

The shell 1 is further provided with an inflow hole 7. The external fluid source 9 is connected to the chamber 2 through an inflow pipe 8. The additional fluid B in the external fluid source 9 enters the chamber 2 through the inflow pipe 8 and the inflow hole 7 or flows out of the chamber 2 to the external fluid source 9. The additional fluid B fills all or part of the space inside the chamber 2.

The density of the additional fluid B is greater than that of the first fluid A. The first fluid A is a gas and the additional fluid B is a liquid. As an example, the first fluid A may be air and the additional fluid B may be water. As an alternative example, the first fluid A may be air and the additional fluid B may be oil.

In the depicted embodiment, the first fluid A is air and the additional fluid B is water, and the description will be continued by using this as an example.

The working principle of this embodiment is that the power component 6 drives the fan 5 to rotate around a vertical shaft in the chamber 2 in a direction illustrated by an arrow in FIG. 2. At the same time, the external fluid source 9 injects water (e.g., the additional fluid B) into the chamber 2 through the inflow hole 7 of the inflow pipe 8, in a direction indicated by an illustrated arrow. If the water only fills part of the space inside the chamber 2, the fan 5 simultaneously drives the air (e.g., the first fluid A) and water in the chamber 2 to rotate. Since the density of water is greater than that of air, and due to the effect of the centrifugal force of the rotating fan 5, the water with the larger density is distributed in a peripheral region of the chamber 2 (e.g., toward the sidewall), and the air with the smaller density is distributed in a central region of the chamber 2. Thus, the centrifugal force separates the fluids by density. If there is the gap C between the chamber 2 and the adsorbed surface of the workpiece 3, the water of a rotating water layer distributed at the outer edge of the chamber 2 flows out of the chamber 2 through the gap C, as indicated by an illustrated arrow; at the same time, the external fluid source 9 continuously inputs the water into the chamber 2 to supplement the corresponding amount of water, as indicated by the illustrated arrow. If the amount of water flowing out of the chamber 2 through the gap C is relatively large, the water supply amount of the external fluid source 9 is increased accordingly, and if the amount of water flowing out of the chamber 2 through the gap C is relatively small, the water supply amount of the external fluid source 9 is reduced accordingly. That is, the external fluid source 9 has a function of adjusting the amount of water. There may be many specific implementations. For example, a water pump with a variable flow may be disposed in the external fluid source 9, and the variable flow of the water pump may be adjusted to increase or decrease the amount of water accordingly. As another example, a flow regulating device (not shown), such as a switching valve, may be disposed at the position of the inflow pipe 8 of the external fluid source 9, and the amount of water flowing out may be adjusted by the frequency of the switching valve.

Figure 3:
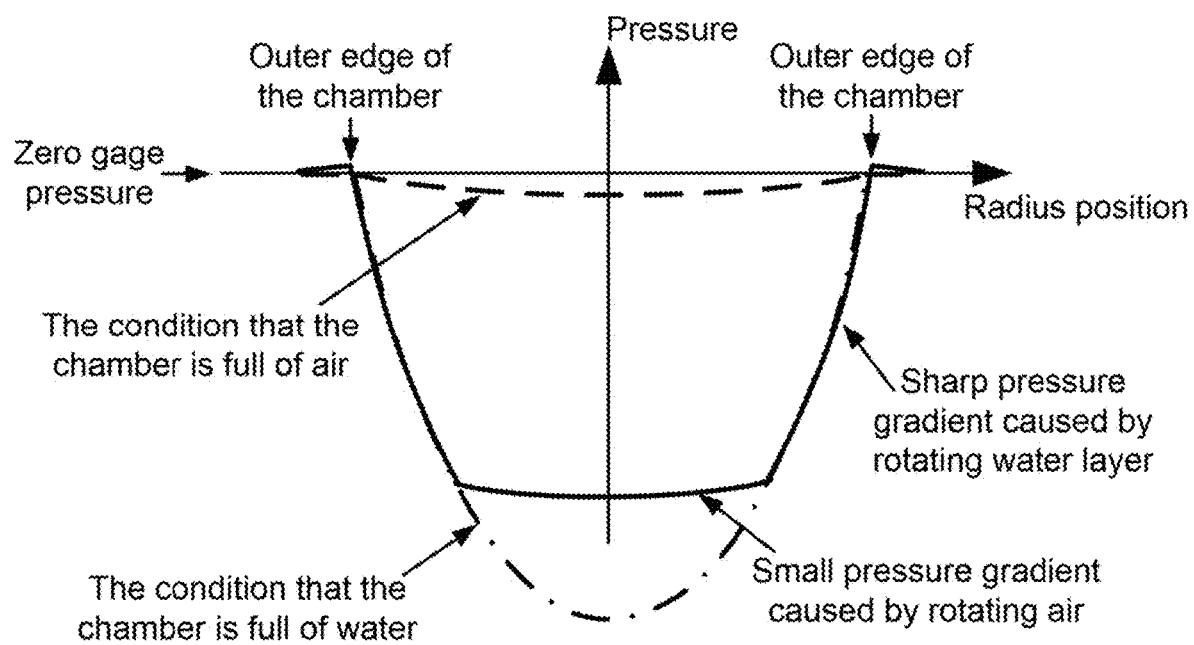
FIG. 3 is a schematic diagram showing a pressure difference distribution of a fluid in a chamber in FIG. 2.

Referring now to FIG. 3, which is described using the components of the suction device shown in FIG. 2, the water and air rotating at a high speed in the chamber 2 form a pressure distribution, as shown by a solid line. In the schematic of FIG. 3, pressure increases vertically in the direction of a labeled arrow, with negative pressure values (e.g., vacuum) below a zero gage pressure line. As the negative pressure value increases (e.g., is further below the zero gage pressure line), a degree of vacuum increases. The present disclosure can achieve the following beneficial effects:

Under the action of the centrifugal force, a negative pressure distribution is formed in the chamber 2. The pressure gradient of the rotating water layer is very sharp (e.g., steep) because of the larger density of water, and therefore, a very large negative pressure is formed in the chamber 2. In contrast, the density of the air is relatively small, so only a relatively small pressure gradient is formed in the central portion of the chamber 2. The suction device of the present disclosure greatly increases the degree of vacuum and the adsorption force in the chamber 2 by utilizing the characteristic that the density of water is much greater than that of air. A pressure distribution shown by a dashed line in FIG. 3 is the pressure distribution under the conditions that the chamber is full of air (e.g., without injecting another, denser fluid into the chamber), and the degree of vacuum formed is much smaller than that of the solid line. Injecting another fluid with a greater density into the chamber 2 increases the degree of vacuum. If the chamber 2 is instead completely filled with water, a pressure distribution shown by a dot-and-dash line in FIG. 3 can be formed. The degree of vacuum will increase further and the adsorption force will also become larger.

It can also be seen from the pressure distribution of FIG. 3 that the pressure formed by the rotating water layer gradually varies, and the pressure at the outermost periphery of the space inside the chamber 2 (e.g., the inner side of the shell 1) is very close to the zero gage pressure. This means that there is no large pressure difference between the inner side and the outer sides of the shell 1, so that vacuum leakage between the shell 1 and the surface of the workpiece 3 is greatly reduced. That is, even if there is a gap between the shell 1 and the surface of the workpiece 3, the outside air will not enter the chamber 2.

A centrifugal inertial force is generated inside the rotating water layer. The direction of the centrifugal inertial force is radially outward, opposite to the direction of vacuum leakage. It is visually understood that when entering the chamber 2, the air is forced outward by the centrifugal force. Therefore, the inertial centrifugal force can effectively resist the vacuum leakage and protect the vacuum environment inside the chamber 2.

If there is the gap C between the chamber 2 and the surface of the workpiece 3, the water of the rotating water layer distributed in the peripheral region of the chamber 2 flows out of the chamber 2 through the gap C. Therefore, the water continuously flows from the external fluid source 9 into the chamber 2 and flows out of the chamber 2 through the gap C. Since the water continuously flows out through the gap C, it is also difficult for the outside air to enter the chamber 2.

Finally, the description of "the original fluid originally present in the chamber" will be explained. This description can be understood as follows: When there is no additional fluid B of the external fluid source 9 in the chamber 2, the fluid in the chamber 2 is the first fluid A. In this embodiment, the suction device is used in an air environment. When there is no water of the external fluid source 9 in the chamber 2, the chamber 2 is filled with air. Then, it can be considered that the first fluid A originally present in the chamber 2 is air.

Embodiment 2

Figure 4:
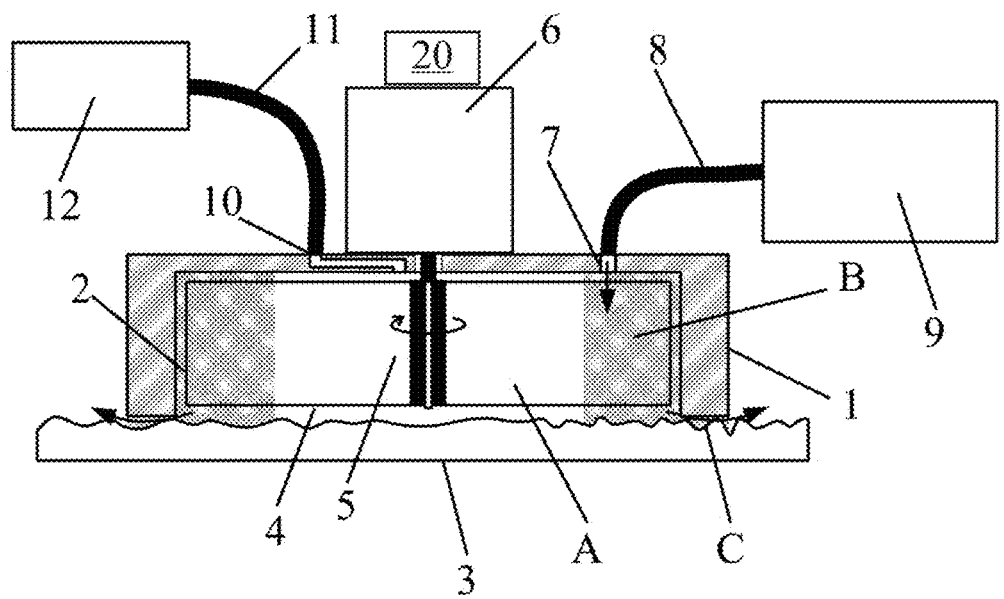
FIG. 4 is a schematic planar cross-sectional view showing a second embodiment of the present disclosure.

Referring to FIG. 4, a second embodiment of the suction device (e.g., Embodiment 2) differs from Embodiment 1 in that the shell 1 is further provided with a suction hole 10, and the suction hole 10 is disposed at a position near the center of the shell 1. One end of the suction hole 10 is connected to a region of the chamber 2 where the additional fluid B is not present, and the other end is connected to a vacuum source 12 through a tube 11. The vacuum source 12 adjusts the degree of vacuum of the region of the chamber 2 where the additional fluid B is not present. Other structures are the same as those in Embodiment 1 of FIG. 2 and will not be described again.

The description will be made by using an example in which the additional fluid B is water and the first fluid A is air. After the vacuum is formed in the chamber 2, a gas dissolved in the water (e.g., the additional fluid B) is separated out. The boiling point of the water is lowered in a low pressure (e.g., vacuum) environment, so the water may vaporize to form water vapor. The air (e.g., the first fluid A) present in the chamber 2, the gas separated out, the water vapor, etc. constitute a mixed gas. The mixed gas has a lower density than water, and therefore accumulates in the central region of the chamber 2, which is the aforementioned region where the additional fluid B is not present. Moreover, since the water continuously separates out the gas and generates the water vapor, as time passes, the gas in the central region increases, and thus the thickness of the rotating water layer is gradually reduced. As the thickness of the rotating water layer becomes smaller, the region of the pressure gradient created by the water layer becomes smaller. This leads to a decrease in the degree of vacuum at the center of the chamber 2, and the adsorption force of the chamber 2 is seriously degraded, eventually losing the adsorption function.

To resolve this problem, expanding on the basic design of Embodiment 1, Embodiment 2 includes a suction hole 10 disposed in the central region of the chamber 2, and the suction hole 10 is connected to the vacuum source 12 through the tube 11. The vacuum source 12 sucks the mixed gas out of the central region of the chamber 2 so that the mixed gas in the central region of the chamber 2 can be eliminated or the volume of the mixed gas in the central region of the chamber 2 can be prevented from increasing. Since the amount of the gas separated out and the water vapor is not large, the power of the vacuum source 12 may be relatively small. In the depicted embodiment, the vacuum source 12 is connected to the central region of the shell through the suction hole 10 and the tube 11, and away from the region of the additional fluid B, thereby avoiding sucking away the additional fluid B.

Embodiment 3

Figure 5:
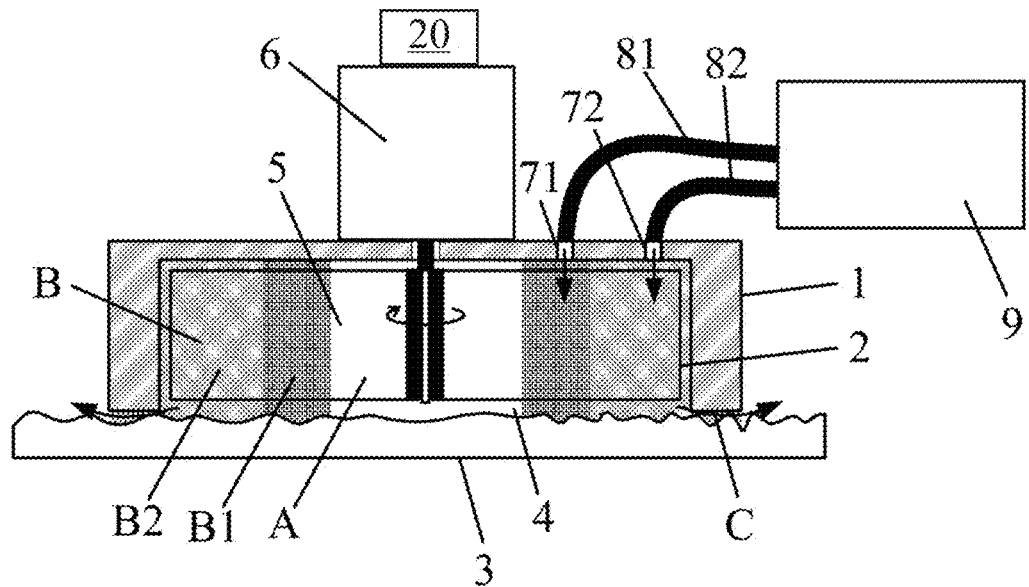
FIG. 5 is a schematic planar cross-sectional view showing a third embodiment of the present disclosure.

The vacuum source 12 is usually driven by a motor (such as a vacuum air pump), and is susceptible to a short circuit if water is sucked into the vacuum source 12. A third embodiment of the suction device (e.g., Embodiment 3) proposes a solution. Referring to FIG. 5, Embodiment 3 of the suction device is shown. Components of Embodiment 3 that are the same as Embodiment 1 of FIG. 2 are numbered the same and may not be reintroduced. The external fluid source 9 contains two additional fluids, a first additional fluid B1 (e.g., a second fluid) and a second additional fluid B2 (e.g., a third fluid). In this embodiment, the first additional fluid B1 is oil and the second additional fluid B2 is water, and a description will be made by using this as an example. However, other fluids are also possible. The shell 1 is further provided with a front inflow hole 71 and a rear inflow hole 72. The front inflow hole 71 is closer to the center of the chamber 2 than the rear inflow hole 72. The external fluid source 9 is connected to the chamber 2 through a front inflow pipe 81 and a rear inflow pipe 82 via the front inflow hole 71 and the rear inflow hole 72, respectively. The first additional fluid B1 and the second additional fluid B2 of the external fluid source 9 pass through the front inflow hole 71 and the rear inflow hole 72, respectively, to flow from the external fluid source 9 into the chamber 2 or flow out of the chamber 2 to the external fluid source 9. The density of the first additional fluid B1 in the front inflow pipe 81 is less than that of the second additional fluid B2 in the rear inflow pipe 82 and greater than that of the first fluid A originally present in the chamber 2. An amount of oil and water is injected into the chamber 2. The fan 5 drives all the fluids in the chamber 2 to rotate under the action of the centrifugal force, and because the density of the water is the largest and the density of the air (the first fluid A) is the smallest, a water layer, an oil layer and an air region are formed in the chamber 2. The oil layer is between the water layer and the air, which effectively separates the water layer from the central air region, thus resolving the problem of water being sucked in by the vacuum source.

It should be additionally noted that water and oil as the additional fluids may also share one inflow hole. The external fluid source 9 may first inject water and then inject oil. In the case of high-speed rotation, the centrifugal force stratifies fluids of different densities, which is independent of the number and locations of inflow holes.

In addition, during actual use, more kinds of additional fluids may be injected into the chamber 2 as needed. For example, more than two additional fluids (e.g., three) may be injected. The working principle is the same and will not be described here.

Embodiment 4

In FIG. 4 of Embodiment 2, the external fluid source 9 inputs the additional fluid B into the chamber 2. The vacuum source 12 determines the value of the negative pressure of the central region, as described above with respect to FIG. 4. In this case, if the input flow of the additional fluid B is too much, the internal rotating water layer is thickened, which causes the peripheral pressure of the chamber to rise, thereby generating a repulsive force and weakening the overall adsorption force; if the input flow of the additional fluid B is insufficient, the internal rotating water layer becomes thinner, which causes the peripheral pressure of the chamber to drop, resulting in a significant pressure difference between the inner side and the outer side of the shell, and causing a vacuum leakage (e.g., outside air flows into the chamber). To accurately control the flow of the additional fluid B, the technical solutions shown in FIG. 6 and FIG. 7 are used.

Figure 6:
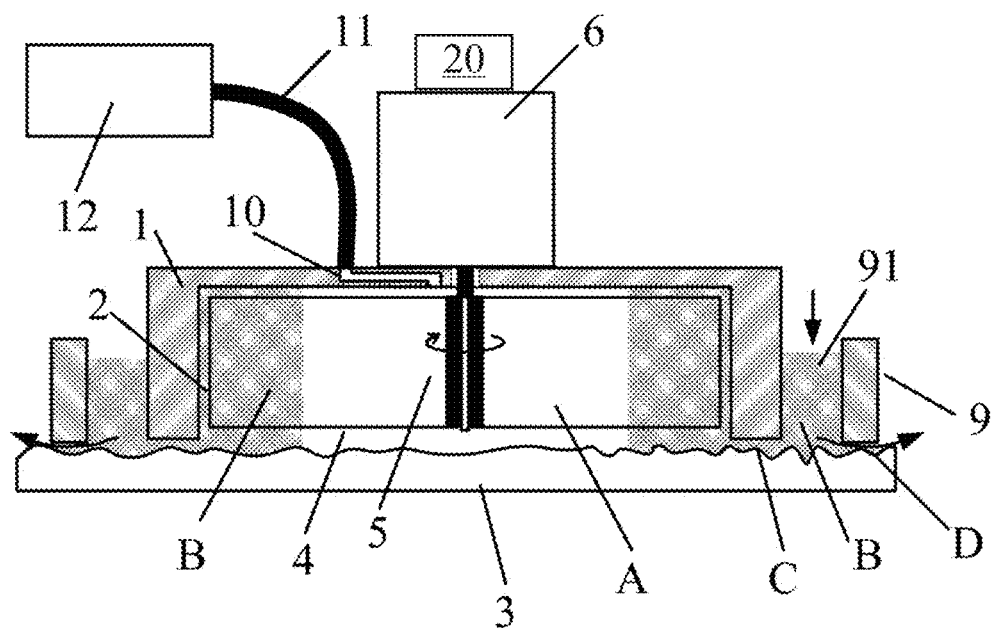
FIG. 6 is a schematic planar cross-sectional view showing a fourth embodiment of the present disclosure.
Figure 7:
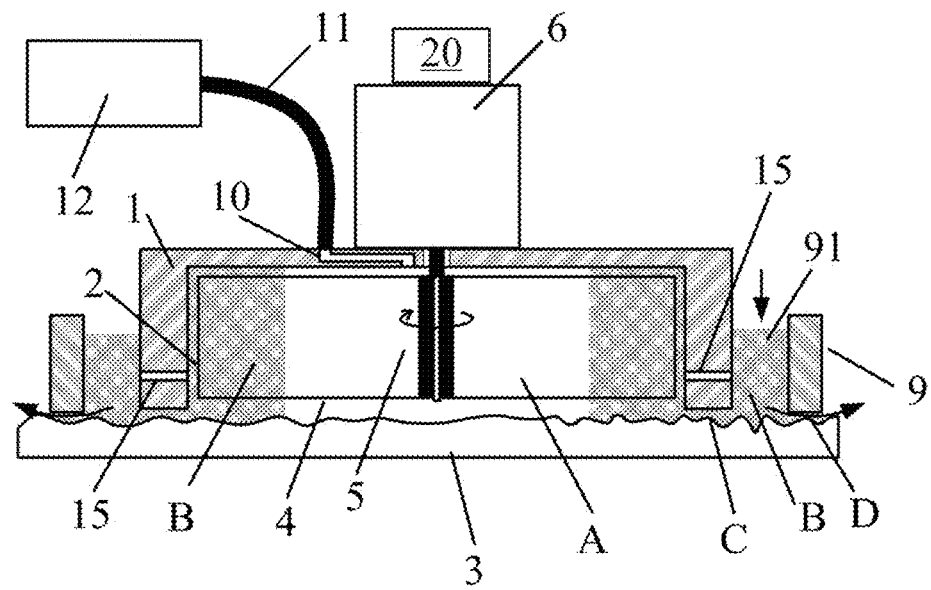
FIG. 7 is a schematic planar cross-sectional view showing another implementation of the fourth embodiment of the present disclosure.

According to the technical solutions, the external fluid source 9 is designed into the structure shown in FIG. 6 for a fourth embodiment (e.g., Embodiment 4) of the suction device. Components of Embodiment 4 that are the same as Embodiment 2 of FIG. 4 are numbered the same and may not be reintroduced. A water tank 91 is established outside the shell for external fluid source 9. The additional fluid B is injected into the water tank 91. The water tank 91 and the chamber 2 are interconnected. The way to connect may be the gap C existing between the shell 1 and the adsorbed surface of the workpiece 3, or a connecting flow channel 15 (shown in FIG. 7) disposed within the side wall of the shell 1. This design of the external fluid source 9 has the following advantages:

The pressure of the additional fluid B in the water tank 91 can be kept the same as the environmental pressure, and no additional pressure control equipment is required.

The additional fluid B in the water tank 91 is connected to the outermost periphery of the chamber 2, and therefore, this ensures that the pressure of the outermost periphery of the chamber 2 is the same as the pressure of the water tank 91, and is also the environmental pressure. In addition, the vacuum source 12 determines the pressure in the central region. The inner and outer side pressures of the rotating water layer are determined, and therefore, the thickness of the water layer can be self-adjusted to maintain a desired thickness.

The water tank 91 also isolates the gap C from the external environment, and the outside air cannot enter the chamber through the gap C.

Embodiment 5

In Embodiment 4 shown in FIGS. 6 and 7, a gap D is formed between the water tank 91 and the surface of the workpiece 3. The water in the water tank 91 may flow out through the gap D. Suppressing the outflow of water can reduce the water consumption of the suction device. Therefore, referring to FIG. 8, a fifth embodiment (e.g., Embodiment 5) of the suction device is shown. Components of Embodiment 5 that are the same as Embodiment 4 of FIGS. 6 and 7 are numbered the same and may not be reintroduced. In this embodiment, the gap D is blocked using a soft sealing body 92, such that the amount of water flowing out can be reduced. Soft sealing body 92 may be comprised of rubber or silicone, for example.

Embodiment 6

Figure 8:
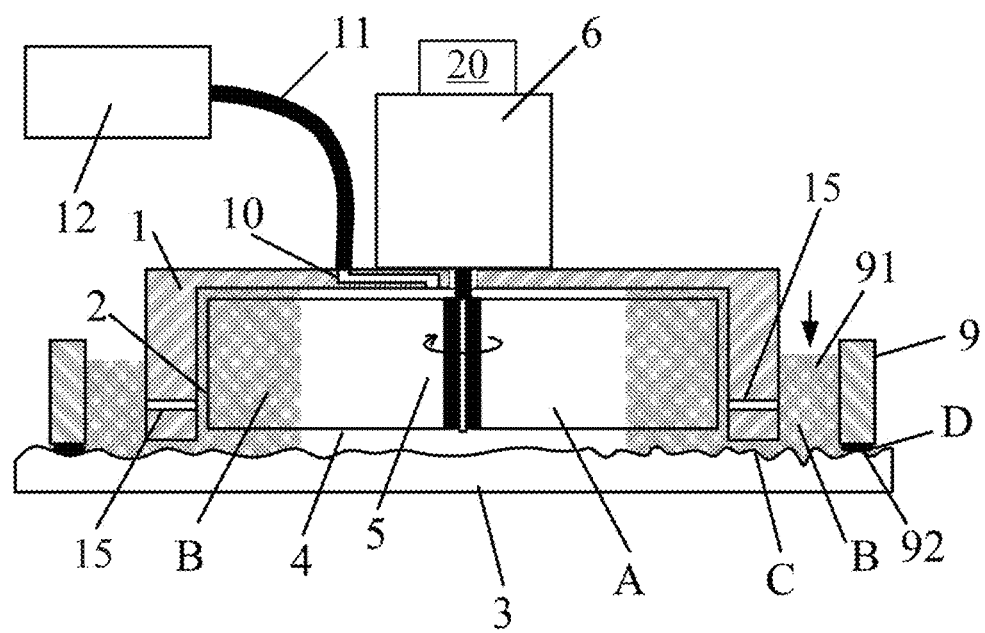
FIG. 8 is a schematic planar cross-sectional view showing a fifth embodiment of the present disclosure.
Figure 9:
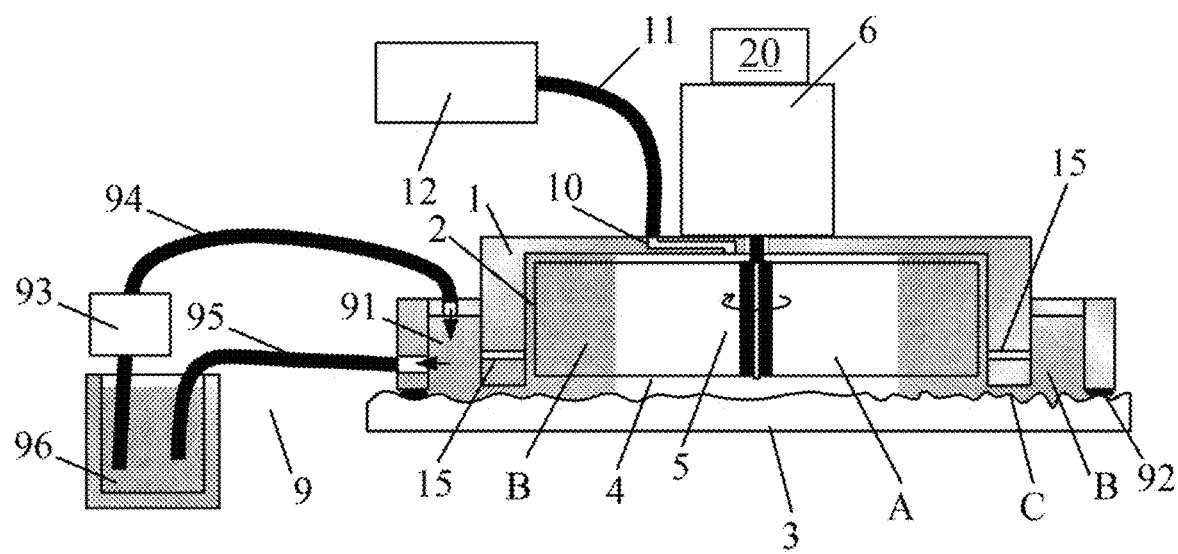
FIG. 9 is a schematic planar cross-sectional view showing a sixth embodiment of the present disclosure.

In the above described Embodiment 5 of FIG. 8, the water tank 91 is open, and when the suction device is not placed horizontally, the water in the water tank 91 may overflow. To resolve this problem, the structure shown in FIG. 9 is used as a sixth embodiment (e.g., Embodiment 6) of the suction device. The water tank 91 forms a semi-closed state. The water tank 91 is connected to an external water tank 96. In this embodiment, the water tank 91 and the external water tank 96 are connected to each other through an inlet (e.g., input) pipe 94 and a return pipe 95. A pump 93 is mounted on the inlet pipe 94. The pump 93 conveys water from the external water tank 96 to the water tank 91, so that the water tank 91 is filled with water. The water then flows back to the external water tank 96 through the return pipe 95. Since the flow resistance of the return pipe 95 is small, such a water circulation can ensure that the pressure of the water tank 91 is substantially equivalent to the external environmental pressure.

Instead of connecting the return pipe 95 to the water tank, an outlet of the return pipe 95 may be directly placed in the external environment, so that the water tank 91 is directly connected to the external environment to directly discharge the water to the external environment. This also ensures that the pressure of the water tank 91 is substantially equivalent to the external environmental pressure.

Embodiment 7

Figure 10:
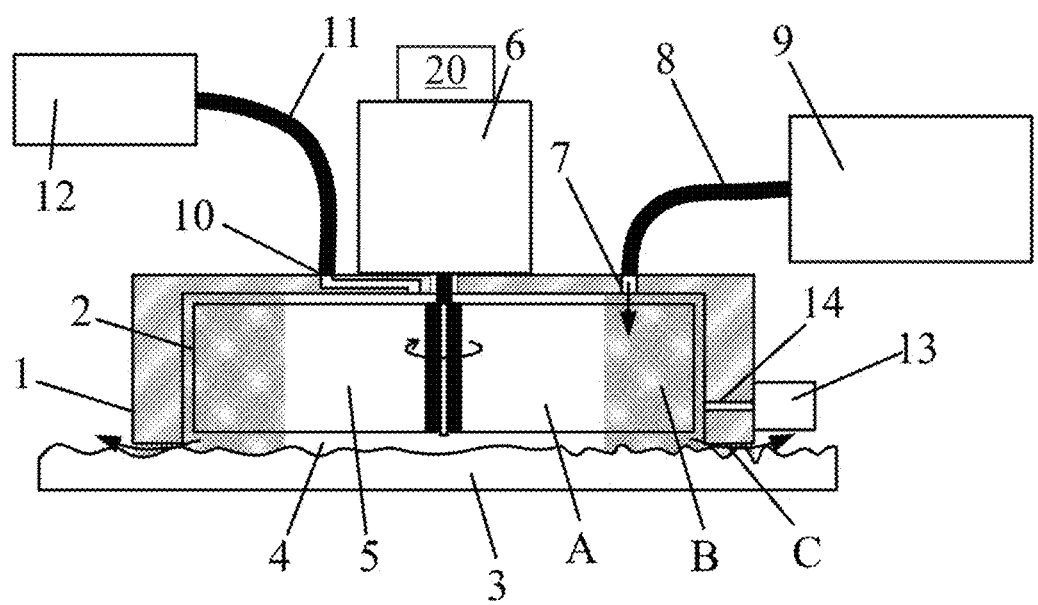
FIG. 10 is a schematic planar cross-sectional view showing a seventh embodiment of the present disclosure.

Referring to FIG. 10, a seventh embodiment (e.g., Embodiment 7) of the suction device is provided and is based on Embodiment 2. The difference between the two is that in Embodiment 7, the shell 1 is further provided with one or more pressure measuring holes 14, and the pressure measuring hole 14 connects the chamber 2 and a pressure sensor 13. The pressure sensor 13 is configured to detect the change in pressure within the chamber 2. Other structures are the same as those in Embodiment 2 of FIG. 4 and will not be described again.

The working principle of Embodiment 7 is that the rotational speed of the fan 5, the thickness of the water layer in the chamber 2, and the degree of vacuum of the vacuum source 12 determine the negative pressure distribution inside the chamber 2. There is a very clear relationship between them. The rotational speed of the fan 5 can be controlled by adjusting the output power of the power component 6, and in addition, it is also very easy to measure the rotational speed of the fan 5; the thickness of the water layer on the periphery of the chamber can be controlled by adjusting the injection flow of the external fluid source 9; and the negative pressure of the region of the chamber where the additional fluid B is not present can be controlled by adjusting the vacuum source 12. The negative pressure at any point inside the chamber 2 and its distribution can be measured by providing the one or more pressure measuring holes 14 in the chamber 2 and connecting (e.g., fluidically coupling) the pressure sensor 13 to the chamber 2. It can be seen that the addition of the one or more pressure measuring holes 14 and the pressure sensor 13 makes the suction device a measurable and controllable closed loop control system. The power component 6 and the external fluid source 9 can be used as control components, the rotational speed and the injection flow are used as control variables, and the negative pressure distribution is used as the control output. Since the integral of the negative pressure distribution on the adsorption area is the adsorption force, it may be considered that the adsorption force is the control output.

As an example, the controller 20 may receive the pressure measurement from the pressure sensor 13. Thus, the controller 20 may be in wired or wireless communication with the pressure sensor 13. The controller 20 may adjust the rotational speed of the fan 5 and/or the injection flow from the external fluid source 9 based on the received pressure measurement. As one example, the controller 20 may be configured as a proportional-integral-derivative controller that adjusts the rotational speed of the fan 5 and/or the injection flow from the external fluid source 9 to drive the pressure measurement measured by the pressure sensor 13 to a target (e.g., desired) pressure value (and therefore a desired adsorption force).

In the example shown in FIG. 10, the pressure measuring hole 14 is provided in the periphery of the shell 1, the pressure measuring hole 14 is connected to the pressure sensor 13, and the measured pressure is the pressure of the periphery of the chamber 2. When it is found that the pressure measured by the pressure sensor 13 decreases and is lower than a lower threshold value, the power output of the power component 6 is increased (e.g., by the controller 20) to increase the rotational speed of the fan 5 to rotate the rotating water layer at a higher speed, so as to increase the pressure to the target pressure value. When it is found that the pressure measured by the pressure sensor 13 increases and is higher than an upper threshold value, the power output the power component 6 is reduced (e.g., by the controller 20) to decrease the rotational speed of the fan 5 to lower the pressure to the target pressure value.

The foregoing descriptions are merely exemplary embodiments of the present disclosure, but are not intended to limit the present disclosure. Any modification, equivalent replacement, or improvement made without departing from the spirit and principle of the present disclosure should fall within the protection scope of the present disclosure.

The invention claimed is:
1. A suction device, comprising:
a shell, including a chamber disposed therein, the chamber including an opening;
a fan disposed in the chamber;
a power component for driving the fan to rotate, the power component disposed on the shell; and
a fluid source holding an additional fluid, the additional fluid different from a first fluid originally present in the chamber, the fluid source connected to the chamber, and wherein the additional fluid of the fluid source flows into the chamber to occupy a volume in the chamber and at least partially forces the first fluid originally present in the chamber out of the chamber, and the fan drives fluids in the chamber to rotate.
2. The suction device according to claim 1, wherein a density of the additional fluid is greater than that of the first fluid originally present in the chamber.

3. The suction device according to claim 1, wherein the shell is further provided with a suction hole, one end of the suction hole is connected to a region of the chamber where the additional fluid is not present, and the other end of the suction hole is connected to a vacuum source.

4. The suction device according to claim 1, wherein the shell is further provided with an inflow hole, and the fluid source is connected to the chamber through an inflow pipe coupled to the inflow hole, the additional fluid of the fluid source flows from the fluid source into the chamber through the inflow hole or flows out of the chamber to the fluid source through the inflow hole, and the fluid source is further provided with a flow regulating device.

5. The suction device according to claim 1, wherein the shell is further provided with one or more inflow holes, the fluid source is connected to the chamber through the one or more inflow holes, one or more additional fluids are disposed in the fluid source and flow from the fluid source into the chamber through the inflow holes or flow out of the chamber to the fluid source through the inflow holes, and the one or more additional fluids are different from the first fluid originally present in the chamber.

6. A suction device, comprising:
a shell, including a chamber disposed therein, the chamber including an opening;
a fan disposed in the chamber;
a power component for driving the fan to rotate, the power component disposed on the shell; and
a fluid source comprising a water tank disposed outside the shell, an additional fluid is disposed in the water tank, the water tank and the chamber are interconnected, and the water tank and an external environment of the shell are also connected to each other, wherein the additional fluid of the fluid source flows into the chamber to occupy a volume in the chamber and at least partially forces the first fluid originally present in the chamber out of the chamber, and the fan drives fluids in the chamber to rotate.

7. The suction device according to claim 6, wherein the additional fluid in the water tank is connected to the chamber through a gap existing between the shell and an adsorbed surface, or is connected to the chamber through a connecting flow channel disposed within the shell.

8. The suction device according to claim 7, wherein a bottom of an outer wall of the water tank includes a soft sealing body for blocking a gap between the outer wall of the water tank and the adsorbed surface.

9. The suction device according to claim 6, wherein the water tank is a semi-closed water tank with a top and side walls closed, and the water tank is provided with an input hole through which the additional fluid flows into the water tank.

10. The suction device according to claim 6, wherein the water tank is connected to an external tank of the additional fluid through an input pipe and a return pipe, and a pump is mounted on the input pipe.

11. The suction device according to claim 1, wherein the shell is further provided with one or more pressure sensors, and the one or more pressure sensors are used to sense pressure changes within the chamber.

12. The suction device according to claim 2, wherein the first fluid is a gas and the additional fluid is a liquid.

13. A suction device, comprising:
a shell including a chamber, the chamber including an opening;
a high-speed rotating liquid in the chamber, and during operation the liquid generates a gas in a low pressure state; and a suction hole disposed in the shell, a first end of the suction hole connected to a region of the chamber where the gas is located and a second end of the suction hole connected to a vacuum source.

14. The suction device according to claim 13, wherein a fan is disposed in the chamber, further comprising a power component for driving the fan to rotate, and the fan drives fluids in the chamber to rotate.

15. The suction device according to claim 13, wherein the suction hole is disposed at a position near a center of the shell.

16. The suction device according to claim 13, wherein a periphery of the chamber is connected to an external environment.

17. The suction device according to claim 16, wherein the periphery of the chamber is connected to the external environment through a gap existing between the shell and an adsorbed surface or through a connecting flow channel disposed in the shell.

* * * * *